United States Patent [19]
Kuipers et al.

[11] Patent Number: 5,523,805
[45] Date of Patent: Jun. 4, 1996

[54] SYSTEM FOR COUPLING LENS TO AN EYEGLASS FRAME

[76] Inventors: Raymond J. Kuipers; Dominica R. Kuipers, both of 27312 Via Segundo, Mission Viejo, Calif. 92692

[21] Appl. No.: 528,772

[22] Filed: Sep. 15, 1995

[51] Int. Cl.⁶ .............................. G02C 1/00; G02C 1/04
[52] U.S. Cl. ............................ 351/86; 351/103; 351/106
[58] Field of Search ................................ 351/83, 85, 86, 351/90, 92, 93, 96, 103, 105, 106, 124

[56] References Cited

U.S. PATENT DOCUMENTS

| | | | |
|---|---|---|---|
| 4,674,851 | 6/1987 | Jannard | 351/47 |
| 4,730,915 | 3/1988 | Jannard | 351/47 |
| 5,455,639 | 10/1995 | Magdelaine et al. | 351/86 |

*Primary Examiner*—William L. Sikes
*Assistant Examiner*—Huy Mai
*Attorney, Agent, or Firm*—Jeffrey P. Aiello

[57] ABSTRACT

A system for coupling lens to an eyeglass frame includes an eyeglass frame with a lens bridge that comprises a mating wall and a coupling wall. A channel is formed between the walls. The coupling wall is arcuate with a tip that projects towards the mating wall. At least one lens is provided for coupling to the bridge. The lens has a coupling region that extends from a top edge of the lens, along both surfaces, and a distance towards a bottom edge of the lens. A first surface of the lens has a groove that extends across the lens and along a bottom perimeter of the coupling region. The groove includes a recessed cavity configured to receive the tip of the coupling wall, to snap-fit the lens to the bridge. A second surface of the coupling region is configured complementary to an inner surface of the mating wall to frictionally engage the mating wall. The lens is coupled to the bridge by pressing the lens into the channel. As the lens is being pressed into the channel, the coupling wall deflects to allow the lens to pass through the aperture until the coupling region substantially resides in the channel. The tip of the coupling wall snaps into the groove, to snap-fit the lens to the bridge. The coupling region frictionally engages the mating wall to aid with coupling the lens to the bridge.

9 Claims, 1 Drawing Sheet

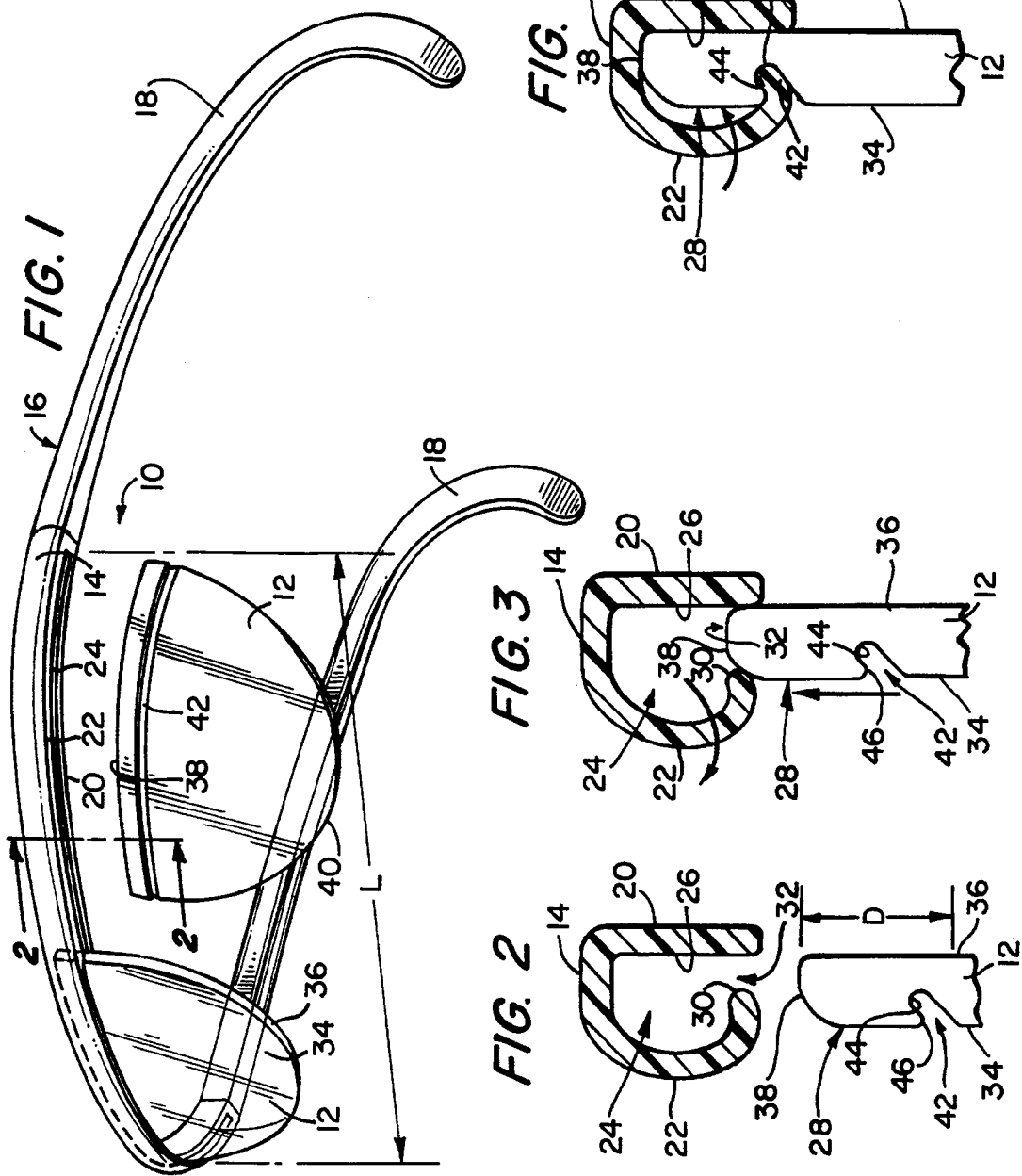

SYSTEM FOR COUPLING LENS TO AN EYEGLASS FRAME

BACKGROUND OF THE INVENTION

1. Field of the Invention

The present invention relates generally to eyewear, and more particularly, to an improved system for coupling lens to an eyeglasses frame.

2. Description of Related Art

Eyeglasses for a number of different applications have been provided in the prior art. Typically, eyeglasses are provided with lens that serve a purpose, such as correcting a wearer's vision, filtering sunlight, or preventing airborne objects from impacting the wearer's eyes. Often the lens may serve more than one of these functions, such as both filtering sunlight and providing impact protection, for example.

In some instances, it may be desirable to change the lens in a frame of the eyeglasses. During sports activities for example, while impact protection is a constant desirous feature, it may be necessary to increase or decrease the tint of the lens, to compensate for different sunlight conditions. Another example would be where the lens needs replacement, due to a changing prescription in the case of corrective lenses, or damage to an impact resistant lens. In these situations, the eyeglass frame is often in good condition and only the lens needs to be replaced. However, since the lens is permanently affixed to the frame, the entire eyeglass is replaced. This becomes somewhat expensive for the consumer and may prevent them from obtaining new lenses when it is necessary.

An example of eyeglasses that embody a detachable lens is disclosed in U.S. Pat. No. 4,730,915, to Jannard. The disclosed sunglasses include a unitary transparent lens that extends in a plane that is preferably precisely cylindrical in as-molded condition. The lens has one or more tangs integral with the pane that project over notched areas, that extend inwardly of rearwardly extending lateral terminals. The sunglasses are also provided with a top frame that consist of relatively rigid molded plastic. The top frame has a slot formed upwardly therein with a shallow recess at each end of the slot. The slot has a curvature slightly different than the pane, to provide a mismatch for gripping the pane. The tangs extend in the shallow recesses, to help retain the pane in the top frame.

A disadvantage of the disclosed sunglasses is that it is not suited for glasses having two lenses. The combination of the mismatch between the slot's curvature and the curvature of the unitary pane, and the further combination of the tangs extending into the recesses, all interact to retain the pane in the top frame. With eyeglasses having two lenses, where the lens do not extend the length of the slot and where the curvature of the lens is not different from the curvature of the frame, the disclosed sunglasses would not retain the lenses in the frame. A further disadvantage of the disclosed sunglasses is that over time the pane and frame may lose some of their resiliency. As the pane loses it's resiliency, the frame becomes brittle and the tangs may break off of the frame, when removing or inserting panes in the slot. Without the tangs, the pane can no longer be securely coupled to the top frame.

U.S. Pat. No. 4,674,851, to Jannard, is directed to removable multi-component sunglasses. The disclosed pane and top frame are substantially the pane and top frame as disclosed in U.S. Pat. No. 4,730,915. However, U.S. Pat. No. 4,674,851 does not include a pane that includes tangs, such as those disclosed in subsequent U.S. Pat. No. 4,730,915. Apparently, the pane of the '851 patent was somewhat prone to inadvertently detaching from the top frame, which necessitated the use of tangs as disclosed in U.S. Pat. No. 4,730,915.

Thus, there exists a need for an improved system for coupling one or more lens to an eyeglasses frame.

OBJECTS OF THE INVENTION

It is therefore an object of the present invention to provide an improved system for coupling one or more lens to an eyeglasses frame;

It is another object of the present invention to provide an improved system for coupling one or more lens to an eyeglasses frame that is not dependent upon the curvatures of either the frame or lens;

It is a further object of the present invention to provide an improved system for coupling one or more lens to an eyeglasses frame that provides facile coupling and removing of the lens to the frame;

It is still another object of the present invention to provide an improved system for coupling one or more lens to an eyeglasses frame that does not damage either the frame of the lens when attaching or detaching the lens to the frame; and It is yet further object of the present invention to provide an improved system for coupling one or more lens to an eyeglasses frame that can be used with corrective, sports, and protective lenses.

SUMMARY OF THE INVENTION

These and other objects and advantages of the present invention are achieved by providing a system for coupling lens to an eyeglass frame. The system includes an eyeglass frame with a rigid lens bridge, that may comprise hard plastic for example. The bridge comprises a mating wall and a coupling wall. Preferably, one of the walls is arcuate while the remaining wall has a planar inner surface. The walls extend substantially parallel to each other along a longitudinal axis of the bridge to form a channel between the walls. In the preferred embodiment, the coupling wall is substantially arcuate and has a tip that projects towards the inner surface of the mating wall.

At least one lens for coupling to the bridge is provided. The lens has a coupling region dimensioned to reside in the channel. The coupling region extends from a top edge of the lens, along both surfaces, and a distance towards a bottom edge of the lens. A first surface of the lens has a groove that extends across the lens, along a bottom perimeter of the coupling region. The groove is configured to receive the tip of the coupling wall, to snap-fit the lens to the bridge. A second surface of the coupling region is configured complementary to the inner surface of the mating wall for frictionally engaging the mating wall.

The lens is coupled to the bridge by first determining the proper location of the lens relative to the bridge, if the are two lenses. The lens is then pressed into the channel. As the lens is being pressed into the channel, either the coupling wall, the mating wall, or both, deflects to allow the lens to pass through the aperture until the coupling region substantially resides in the channel. The tip of the coupling wall snaps into the groove, to snap-fit the lens to the bridge. The tip of the coupling wall resides in the groove to inhibit the lens from inadvertently detaching from the bridge. Therefore, lens that do not extend the entire length of the channel or substantially match the curvature of the bridge can be securely coupled to the bridge. The coupling region has a width greater than the diameter of the aperture, but less than the diameter of the channel, which causes the tip to press the coupling region against the mating wall. Thus, the coupling region frictionally engages the mating wall to aid with coupling the lens to the bridge.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a perspective view of an eyeglass frame and a pair of lenses embodying a preferred embodiment of the system of the present invention;

FIG. 2 is a cross sectional view of the system of the preferred embodiment taken along lines 2—2 of FIG. 1;

FIG. 3 is a cross sectional view of the system of the preferred embodiment prior to coupling the lens to a lens bridge; and FIG. 4 is a cross sectional view of the system of the preferred embodiment of the present invention showing the lens coupled to the lens bridge.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein.

Referring now to FIG. 1 of the drawings there is show generally at 10, a preferred embodiment of a system for coupling one or more lens 12 to a lens bridge 14 of an eyeglass frame 16 constructed according to the principles of the present invention. The eyeglass frame 16 includes the lens bridge 14 and a pair of temples 18 hingably coupled to ends of the bridge 14, as is well known in the art. The bridge 14 may comprise any suitable rigid material, such as a known molded hard plastic. The bridge 14 has a longitudinal axis L and may be either arcuate or rectilinear in shape.

Referring now to the drawing figures, the bridge 14 comprises a mating wall 20 and a coupling wall 22. The mating and coupling walls 20, 22 extend parallel to one another along the is longitudinal axis L of the bridge 14, forming a channel 24 between the walls 20, 22. In the preferred embodiment, the coupling wall 22 is shown as being the outermost wall, with the mating wall 20 being the innermost wall. However, the orientation of these walls 20, 22 is not critical, as long as each wall is provided. While the bridge 14 is substantially rigid, it should be sufficiently deflectable to enable either the mating wall 20, the coupling wall 22, or both walls 20, 22 to deflect outwardly for receiving the lens 12 in the channel 24. Preferably, the coupling wall 22 is deflectable to receive the lens 12 in the channel 24.

The mating wall 20 is shown having an inner surface 26 for frictionally engaging a coupling region 28, of the lens 12, more thoroughly discussed hereafter. In the preferred embodiment, the inner surface 26 is substantially planar and extends transverse to the longitudinal axis L of the bridge 14. The inner surface 26 of the mating wall 20 may be other suitable configurations foraged complementary to the configuration of the coupling region 28 of the lens 12.

The coupling wall 22 extends outwardly from the mating wall 20 to provide the channel 24 therebetween. Preferably, the coupling wall 22 is substantially arcuate in cross-sectional configuration and includes a tip 30 that may project upwardly. The tip 30 projects upwardly and rearwardly towards the inner surface 26 of the mating wall 20 to form an aperture 32 (best seen in FIG. 2) between the tip 30 and the mating wall 20. The tip 30 extends sufficiently towards the mating wall 20, so that the aperture 32 has a diameter less than the diameter of the channel 24. The tip 30 preferably projects upwardly and rearwardly towards the mating wall 20, to prevent the lens 12 from inadvertently detaching from the bridge 14, when the lens 12 is coupled to the bridge 14.

Referring still to the drawing figures, while two lenses 12 are shown, it is to be understood that a single, unitary lens (not shown) may be provided in the system 10 of the present invention. If a unitary lens is provided, the lens may extend substantially the length of the channel 24. The coupling region 28 extends from a top edge 38 of the lens 12, along a first surface 34 and a second surface 36 of the lens 12. The coupling region 28 extends down the lens 12 a predetermined distance D (best seen in FIG. 2) towards a bottom edge 40 of the lens 12. The distance D is preferably substantially equal to the width of the mating wall 20 on the second surface 36. The coupling region 28 is dimensioned so that the width of the region 28 is greater than the diameter of the aperture 32 and less than the diameter of the channel 24, so that the lens 12 snap-fits into the lens bridge 14.

The first surface 34 of the lens has a groove 42 that extends across the first surface 34, along a bottom perimeter of the coupling region 28, and substantially parallel to the top edge 38. The distance D of the coupling region 28 along the first surface 34, between the top edge 38 of the lens 12 and the groove 42, is slightly greater than the arc of the coupling wall 22, so that the tip 30 snaps into the groove 42 when coupling the lens 12 to the bridge 14.

In the preferred embodiment, the groove 42 has a substantially J-shaped cross-sectional configuration, such that the groove has an upwardly sloped side that terminates in a recessed cavity 44. The cavity 44 is dimensioned to receive the tip 30, for snap-fitting the lens 12 to the bridge 14. A flange 46 is formed between the cavity 44 and the first surface 34 of the lens 12. The flange 46 aids with retaining the tip 30 in the cavity 44.

Referring now to FIGS. 2–4 of the drawings, the lens 12 is coupled to the bridge 14, by first determining the proper location of the lens 12 relative to the bridge 14, if two lenses 12 are provided. The lens 12 is then pressed into the channel 24. As the lens 12 is being pressed into the channel 24, the coupling wall 22 deflects outwardly to allow the lens 12 to pass through the aperture 32 until the coupling region 28 substantially resides in the channel 24. The tip 30 of the coupling wall 22 snaps into the groove 42, to snap-fit the lens 12 to the bridge 14. The upwardly projecting tip 30 of the coupling wall 22 resides in the groove 42 to inhibit the lens 12 from inadvertently detaching from the bridge 14.

Therefore, lens 12 that do not extend the entire length of the channel 24 or have substantially the same curvature as the bridge 14, can be securely coupled to the bridge 14. The coupling region 20 has a width greater than the diameter of the aperture 32, but less than the diameter of the channel 24, which causes the tip 30 to press the coupling region 28 against the mating wall 20. Thus, the coupling region 28 frictionally engages the mating wall 20 to aid with coupling the lens 12 to the bridge 14.

Those skilled in the art will appreciate that various adaptations and modifications of the just-described preferred, embodiments can be configured without departing from the scope and spirit of the invention. Therefore, it is to be understood, that, within the scope of the appended claims, the invention may be practiced other than as specifically described herein.

What is claimed is:

1. A system for coupling lens to an eyeglass frame comprising:

an eyeglass frame comprising a lens bridge and a pair of temples hingably coupled to ends of the bridge, the bridge comprising a mating wall and a deflectable coupling wall, the mating and coupling walls extending parallel to one another forming a channel therebetween, the coupling wall having an end portion projecting towards the mating wall forming an aperture between the end portion and the mating wall, the aperture having a diameter less than the diameter of the channel; and at least one lens having opposing surfaces, a first surface of the lens having a groove extending thereacross for receiving the end portion of the coupling wall, the groove extending substantially parallel to a top edge of the lens and located adjacent thereto, a second surface of the lens having a coupling portion configured to frictionally engage the mating wall, the coupling portion extending between the top edge and a position parallel to the groove and across the lens, whereby the lens is pressed into the channel, the coupling wall deflecting to allow the lens to pass through the aperture until the top edge resides in the channel with the end portion snapping into the groove to couple the lens to the bridge, the end portion pressing the lens against the mating wall so that the coupling portion frictionally engages the wall, the end portion residing in the groove, in combination with the coupling portion frictionally engaging the mating wall, preventing the lens from inadvertently detaching from the bridge.

2. The system of claim 1 wherein the end portion of the coupling wall is substantially arcuate and terminates in a tip that extends upwardly and rearwardly towards the mating wall.

3. The system of claim 2 wherein the groove is substantially J-shaped in cross-sectional configuration, such that the groove has an upwardly sloped side that terminates in a recessed cavity dimensioned to receive the tip of the end portion for coupling the lens to the bridge, a flange being formed between the cavity and the first surface of the lens to aid with retaining the tip of the end portion in the cavity.

4. The system of claim 1 wherein the coupling wall comprises a deflectable hard plastic.

5. The system of claim 1 wherein the lens is dimensioned so that a width of the lens is greater than the diameter of the aperture and less than the diameter of the channel so that the lens snap-fits into the lens bridge.

6. A system for coupling lens to an eyeglass frame comprising:

an eyeglass frame comprising a hard plastic lens bridge and a pair of temples hingably coupled to ends of the bridge, the bridge having a longitudinal axis and comprising a mating wall and a deflectable coupling wall, the mating and coupling walls extending parallel to one another forming a channel therebetween, the mating wall having a planar inner surface extending transverse to the longitudinal axis of the bridge, the coupling wall extending outwardly from the mating wall and being arcuate in cross-sectional configuration, a tip of the coupling wall projecting upwardly and rearwardly towards the inner surface of the mating wall to form an aperture between the tip and the mating wall, the aperture having a diameter less than the diameter of the channel; and at least one lens having opposing first and second surfaces and a coupling region, the coupling region extending from a top edge of the lens, along both surfaces, and a predetermined distance towards a bottom edge of the lens, the first surface of the lens having a groove extending across the lens along a bottom perimeter of the coupling region and substantially parallel to the top edge, the groove having a substantially J-shaped cross-sectional configuration, such that the groove has an upwardly sloped side that terminates in a recessed cavity dimensioned to receive the tip of the coupling wall to snap-fit the lens to the bridge, a flange being formed between the cavity and the first surface of the lens to aid with retaining the tip in the cavity, the second surface of the coupling region configured substantially planar to frictionally engage the inner surface of the mating wall when the lens is coupled to the bridge, whereby the lens is pressed into the channel, the coupling wall deflecting to allow the lens to pass through the aperture until the coupling region substantially resides in the channel with the tip of the coupling wall snapping into the groove to snap-fit the lens to the bridge, the tip pressing the lens against the mating wall so that the coupling region frictionally engages the wall, the tip residing in the groove, in combination with the coupling region frictionally engaging the mating wall, preventing the lens from inadvertently detaching from the bridge.

7. The system of claim 6 wherein the lens is dimensioned so that a width of the coupling region is greater than the diameter of the aperture and less than the diameter of the channel so that the lens snap-fits into the lens bridge.

8. The system of claim 6 wherein a length of the coupling region is substantially equal to a width of the planar inner surface of the mating wall and a length of the coupling wall is substantially equal to the length of the coupling region.

9. A system for coupling lens to an eyeglass frame comprising:

at least one lens having opposing first and second surfaces and a coupling region, the coupling region extending from a top edge of the lens, along both surfaces, and a predetermined distance towards a bottom edge of the lens, the first surface of the lens having a groove extending across the lens along a bottom perimeter of the coupling region and substantially parallel to the top edge; and an eyeglass frame including a lens bridge, the lens bridge comprising receiving means and deflectable coupling means, the receiving means configured to frictionally engage the second surface of the coupling region, the coupling means extending substantially parallel to the receiving means forming a channel for receiving the coupling region therebetween, the coupling means including a tip adapted to project into the groove for detachably coupling the lens to the lens bridge, whereby the lens is pressed into the channel, the coupling means deflecting to allow the lens to pass into the channel until the coupling region substantially resides in the channel with the tip of the coupling means snapping into the groove to snap-fit the lens to the bridge, the tip pressing the lens against the receiving means so that the coupling region frictionally engages the receiving means, preventing the lens from inadvertently detaching from the bridge.

* * * * *